US006269358B1

(12) United States Patent
Hirata

(10) Patent No.: US 6,269,358 B1
(45) Date of Patent: Jul. 31, 2001

(54) METHOD AND SYSTEM FOR SIMILARITY-BASED IMAGE CLASSIFICATION

(76) Inventor: Kyoji Hirata, 402 Rockefeller Dr., Apt. 11B, Sunnyvale, CA (US) 94087

( * ) Notice: Subject to any disclaimer, the term of this patent is extended or adjusted under 35 U.S.C. 154(b) by 0 days.

(21) Appl. No.: 09/595,807

(22) Filed: Jun. 16, 2000

Related U.S. Application Data

(62) Division of application No. 09/064,086, filed on Apr. 22, 1998.

(51) Int. Cl.$^7$ .................................................. G06F 17/30
(52) U.S. Cl. .............................. 707/1; 707/104; 709/218; 382/305
(58) Field of Search ................................ 707/6.1–2, 104, 707/3–5; 709/217–219; 382/190, 192, 3.5

(56) References Cited

U.S. PATENT DOCUMENTS

| | | | |
|---|---|---|---|
| 5,579,471 | 11/1996 | Barber et al. | 395/326 |
| 5,647,058 | 7/1997 | Agrawal et al. | 395/326 |
| 5,852,823 | 12/1998 | De Bonet | 707/6 |
| 5,893,095 | 4/1999 | Jain et al. | 707/6 |

OTHER PUBLICATIONS

"Geographical Image Classification and Retrieval," Sheikhuleslami et al., Proceedings of the 5th International Workshop on Advances in Geographic Information Systems, Las Vegas, USA, Nov. 10–14, 1975, pp.58–61.*
"Region–Based Image Querying," Carson et al., Proceedings of the 1997 IEEE Workshop on Content–Based Access of Image and Video Libraries, Jun., 1997, pp. 42–59.*
Microsoft Press Computer Dictionary, 2nd Edition, 1994, p. 326.*
"Retrieval of the Trade mark images by shape feature—the ARTISAN project," IEE Coolquium in Intelligent Image Databases, 1996, pp. 9/1 through 9/6, Sep. 1996.*
Orphanoudakis et al., "I2Cnet: Content–based Similarity Search in Geographically Distributed Repositories of Medical Images," Computerized Medical Imaging and Graphics, vol. 20, No. 4, pp. 193–207, Jul. 1996.
Kanahara et al., "A Flexible Image Retrieval Using Explicit Visual Instruction," Proceedings of the 1995 Third Int'l Conference on Document Analysis and Recognition, vol. 1, Aug. 1995, IEEE, pp. 175–178.
Smith et al., "SaFe: A General Framework for Integrated Spatial and Feature Image Search," IEEE First Workshop on Multimedia Processing, Jun. 1997, pp. 301–306.
Smith et al., "Visually Searching the Web for Content," IEEE Multimedia, vol. 4, No. 3, pp. 12–20, Jul. 1997.
A. Del Bimbo and B. Pala, "Shape Indexing by Structural Properties", International Conference on Human Factors in Computing Systems, pp. 370–377, Jun. 1997.
Chad Carson, et al., "Color–and Texture–Based Image Segmentation Using EM and Its Application to Image Querying and Classification", IEEE Transaction on Pattern Analysis and Machine Intelligence, in review (http://www.cs.berkeley.edu/~carson/papers/pami.html).

(List continued on next page.)

Primary Examiner—Hosain T. Alam
(74) Attorney, Agent, or Firm—Sughrue, Mion, Zinn, Macpeak & Seas, PLLC

(57) ABSTRACT

A method and apparatus for classifying and querying a database of images, in which the images in the database are classified using primary objects as a clustering center. A query interface is presented to the user allowing the user to use the primary objects to formulate queries to be applied to the classified database of images.

24 Claims, 7 Drawing Sheets

OTHER PUBLICATIONS

Kyoji Hirata et al., "The Concept of Media–Based Navigation and Its Implementation on Hypermedia System 'Miyabi'", *NEC Research and Development,* vol. 35, No. 4, pp. 410–420, Oct. 1994.

Myron Flickner, et al., "Query by Image and Video Content: The QBIC™ System", *IEEE Computer,* 28(9):23–31, Sep. 1995.

Rajiv Mehrotra and James E. Gary, "Similar–Shape Retrieval in Shape Data Management", *IEEE Computer,* pp. 57–62, Sep. 1995.

Sougata Mukherjea, et al., "Towards a Multimedia World–Wide Web Information Retrieval Engine", Proceedings of the Sixth International World–Wide Web Conference, pp. 177–188, Apr. 1997.

* cited by examiner

Horizontal Line    Object at the Center    Integrated Query
(Object at the center with
Horizontal Line)

METHOD AND SYSTEM FOR SIMILARITY-BASED IMAGE CLASSIFICATION

This application is a divisional of application Ser. No. 09/064,086, filed on Apr. 22, 1998.

BACKGROUND OF THE INVENTION

1. Field of the Invention

This invention relates generally to the field of classifying and querying a database of images.

2. Description of the Related Art

Huge amounts of information are being circulated daily at an uninterrupted pace on the World-Wide Web (WWW). Additionally, in museums and photo stock agencies, millions of images are stored for on-line usage. With the explosive growth in the volume and distribution of information, more intelligent information processing and management has become critical. Various methods of accessing target data have been developed to address issues relating to image retrieval, image clustering, query interface and WWW information retrieval.

Several experimental image-clustering systems have also been proposed. In K. Hirata, et al, "The Concept of Media-based Navigation and Its Implementation on Hypermedia System 'Miyabi'," NEC Research & Development, Vol.35, No. 4, pp. 410–420, October 1994, the present inventor has focused on color information. Color values are extracted from the image and are mapped on to hue, lightness and saturation (HLS) color spaces. Based on the results, users can access an images directory or filter out the images for searching.

A. Del Bimbo, et al, "Shape Indexing by Structural Properties," International Conference on Multimedia Computing and Systems, pp.370–377, June, 1997 focuses on clustering based upon shape similarity. Based on a multi-scale analysis, Del Bimbo et al. have attempted to extract the hierarchical structure of shape. Using this hierarchical structure, Del Bimbo et al. have tried to provide effective search capabilities. While this method is based on the boundary analysis, it assumes that boundary is extracted correctly. However, this is not always the case, since images extracted from the Web usually include so many elements, thus, making it difficult to extract individual objects. Del Bimbo et al. does not describe a way to solve this problem.

Image indexing using feature vectors is based on moment invariant (See, e.g., Flickner et al, "Query by Image and Video Content: The QBIC System," Intelligent Multimedia Information Retrieval, edited by Mark T. Maybury, Chapter 1, Reprinted from IEEE Computer, 28(9): 23–31, September, 1995), or on boundary features (See R. Mehrotra et al, "Similar-Shape Retrieval in Shape Data Management," IEEE Computer, pp. 57–62, September 1995). Such image indexing also assumes the correct extraction of the object (or input by a user). This method is very hard to apply directly to large-scale image systems, such as the WWW, requiring automatic classification.

C. Carson, et al, "Color- and Texture-Based Image Segmentation Using EM and Its Application to Image Querying and Classification," IEEE Transaction on Pattern Analysis and Machine Intelligence, in review (http://www.cs.berkeley.edu/~carson/papers/pami.html), extracts objects from images based on color and texture. Using the combination of extracted objects and their attributes (top two colors and texture), Carson et al. tries to categorize images into several groups. Shape or positional information is not considered.

SUMMARY OF THE INVENTION

To overcome these and other difficulties, the present invention is directed to a novel method and apparatus for content based image classification and searching. A method and apparatus are described which utilize the concept of a primary object or shape. The primary object or shape corresponds to one simple composition or one simple object in the image and is defined according to the application. In accordance with the invention, a search engine classifies images in a database using the primary object as a clustering center. To perform this classification, the search engine uses boundary line similarity criteria. The compositional information of the image is described using a set of these primary objects. These classification methods improve graphical query operations as well as search speed.

A new query interface is also presented, based upon the primary objects utilizing the results of the aforementioned classification. Users need only to specify a set of primary objects to create a query. This helps reduce the user's cognitive barrier in specifying a query.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of a method and apparatus for classifying and querying a database of images is described below in detail with reference to the accompanying drawings. It is to be noted that while the following discussion is presented in the context of the Content Oriented Information Retrieval engine (the COIR engine), where the instant inventor has assisted in developing the COIR engine, the present invention is not so limited. The present invention may be applied to a variety of search engines for the WWW, multimedia databases, etc.

The present invention provides improved search capabilities to address problems with existing search engines. There are times when users simply wish to browse through image archives. In such a system, the user will want to know of the types of images stored in the archives. Currently, it is very difficult to correctly understand the distribution of images for large scale image archives. Categorization based on keywords helps users understand whole image sets. But users also want to know the distribution of the images from a visual viewpoint, thereby making such classification desirable. Classification also helps to reduce computational costs for matching.

Another problem with existing search engines is that, in order to retrieve images by their content, the user must specify visual examples as query images. However, it is sometimes very difficult to specify visual examples as search queries, since it is not always easy to draw a rough sketch of the desired query image. Simpler query specification methods are required.

Figure 1:
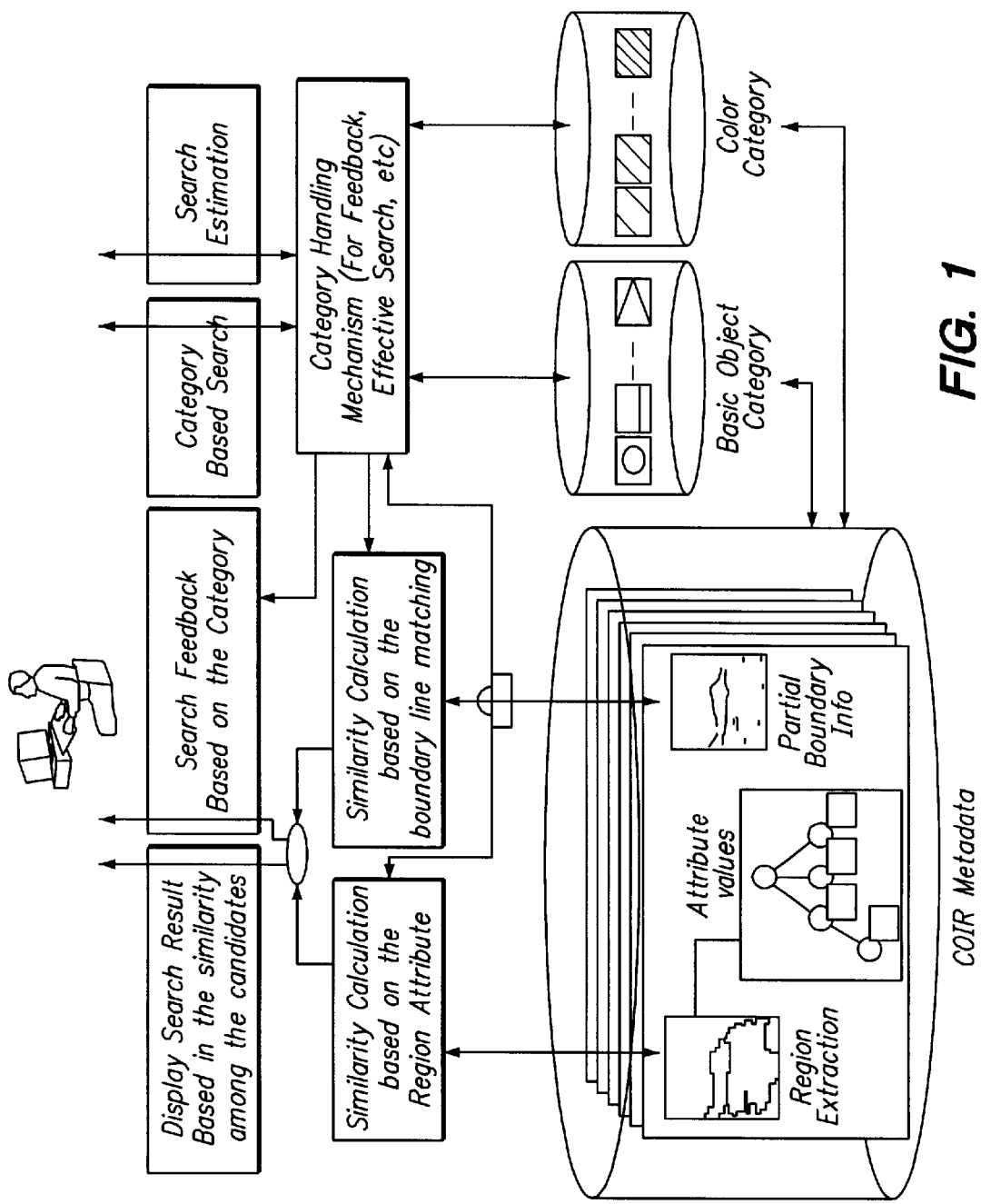
FIG. 1 shows the extended functions of the COIR engine.

The present invention provides a solution to these problems by providing extended functions for a search engine. In the context of the COIR engine, the extended functions are shown in FIG. 1. Some of the functions will now be briefly described.

The first extended function is classification based on primary objects. This step classifies images into categories based on the objects contained in the images. For classification based on the composition of the objects, boundary-based similarity is used. This is described in more detail in related application Ser. No. 09/064,061, entitled "method and Apparatus for Image Querying Using Object boundaries," to K. Hirata, filed on the same day as the present application and assigned to the assignee of the present application, the contents of which are incorporated herein by reference. In accordance with the present invention, primary objects are used to focus on specific objects or the specific composition in the images and to classify images based on a meaningful unit. Primary objects or shapes represent a simple composition or a simple object in the image. A circle, triangle, square and line are some examples of primary objects. Other primary objects may be used. They are flexibly defined according to the application. The images in a database are classified using these primary objects as the clustering center. Each category is represented using a primary object. Since these primary objects are intuitive, it is easy for a user to understand the images stored in each category.

Another extended function supports users in creating a query image using the primary objects. Instead of specifying an image displayed on a computer screen or drawing a rough sketch, in accordance with the present invention, users can simply specify a set of primary objects. Compared with drawing a rough sketch, it is easy for users to create a visual example as a query using primary objects. Users can specify multiple primary objects at one time and merge the effects of the specified primary objects. Thus, the user can create a wide variety of queries by combining primary objects. The primary object is so simple and intuitive that it allows the user to imagine the effect of combining multiple primary objects. Additionally, by specifying different threshold values for each primary object, users can introduce the idea of weighting into the query.

Another extended function allows for the categorization of result candidates based on objects contained in the image. This function works to let users know what types of objects are included in the result candidates. Additionally, the user may specify how the result candidates are reordered based on components such as primary object. This allows the user to focus on a set of shape components in the images and get the results.

These functions will now be described in further detail. First, image classification will be discussed. A cluster of images may be created based upon similarities among images. Additionally, a cluster representative image may be defined. As an example, in prior systems this is accomplished through the following steps.

(1) Calculate the similarities among all pairs of images in the system. (These similarities are from the total viewpoint including color, shape, composition, etc.)

(2) Based on the calculated similarity values, evaluate the distribution of the images and cluster them.

(3) From each cluster, extract representative images based upon the distribution inside the cluster. (Calculate the similarities between the representative candidate and all other images in the cluster and extract the average similarity. The cluster representative image is the one which has the highest average similarity.)

This approach works well and provides intuitive clustering results when the similarity viewpoint is expressed uniformly. However, since images have many similarity viewpoints, sometimes it is very hard to get intuitive clustering results and cluster representatives.

Figure 2A:
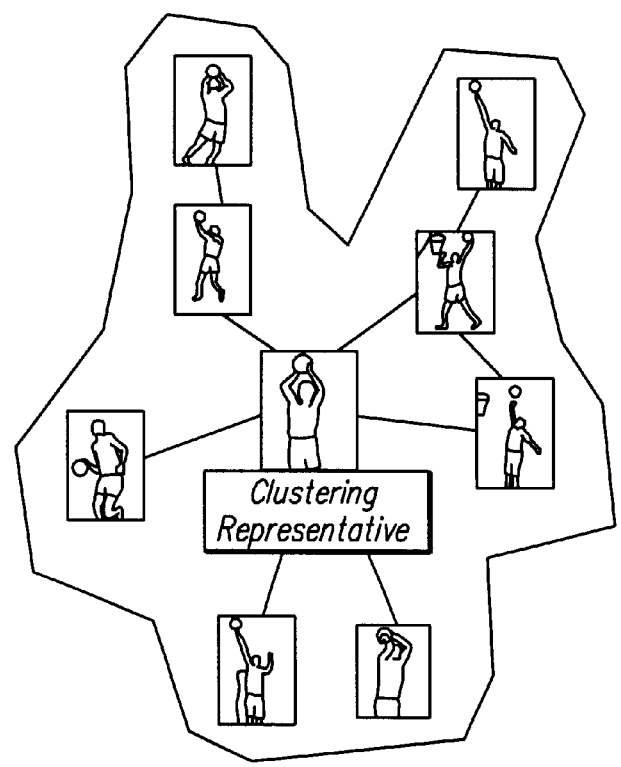
FIG. 2 which includes FIG. 2($a$), and FIG. 2($b$) show the results of clustering and the relationship between the result candidates where the color-shape ratio was specified to be equal.
Figure 2B:
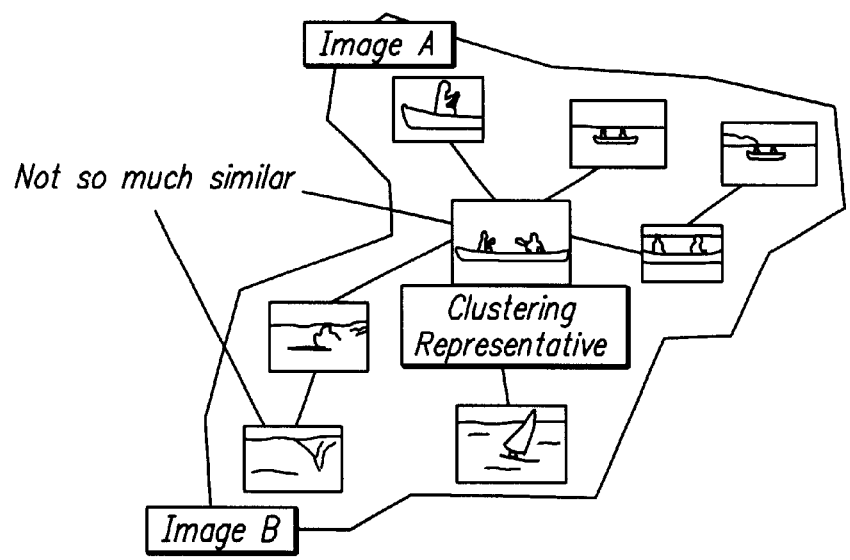

FIG. 2 illustrates the clustering results, in accordance with the steps just described for prior systems, and relationship among images, where the color-shape ratio was specified to be equal. In FIG. 2(a), all the connected images resemble each other. The image in which a basketball player is making a free throw is the candidate for the cluster representative image for the cluster shown in FIG. 2(a). The candidate for cluster representative in this case represents the characteristics of the cluster very well. However, in FIG. 2(b), we can see that there are two different similarity values which are contributing to the clustering. The upper four images are mainly classified based upon color-compositional similarities, while the lower three images are mainly classified based upon shape-compositional similarities. In the case of FIG. 2(b), it is hard to say that the candidate for cluster representative accurately represents the characteristics of this cluster. In this case, it is very hard to choose a good cluster representative which explains the characteristics of the cluster correctly. In general, it is difficult to say that if image A is similar to image B and image B is similar to image C, image A would be similar to image C. This is especially so in the situation in which so many factors contribute to similarity. Clustering based on mutual relationships is sometimes unstable.

The present invention addresses deficiencies in prior systems by providing a novel type of classification function, which is based on primary object. This will now be explained in more detail.

In accordance with the present invention, the typical units of an image are defined as primary objects. The images are then classified using the primary objects as the clustering centers. The primary objects help to simplify the similarity viewpoint. Each primary object corresponds to one simple composition or one simple object in the image. The compositional information is described as a set of these primary objects. These primary objects are defined according to the application fields.

Figure 3:
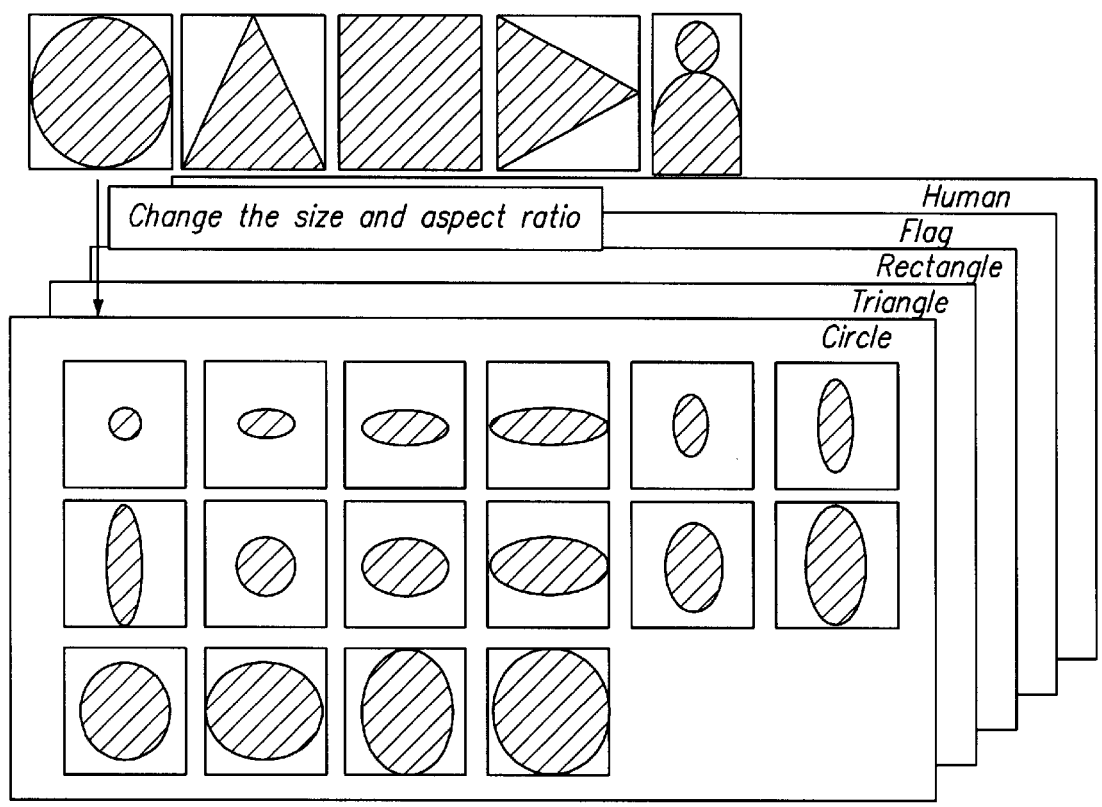
FIG. 3 shows an example of a set of primary objects.

In one implementation of the present invention, several basic objects are defined, including a "circle object", a "rectangular object", a "triangular object" and so on. The size and aspect ratio of each component may be changed. FIG. 3 illustrates a set of primary objects.

Each primary object is so simple that the results of the classification are uniform. Since each primary object expresses a meaningful object by itself, it is easy for users to understand the images classified based upon the objects. The primary objects also work well as cluster representative images.

In accordance with the present invention, images are classified based upon primary objects in accordance with the following steps.

(1) Specify the Basic Objects

Users specify the basic objects interactively according to the application. In FIG. 3 five basic objects are specified. It is possible to specify composite objects such as a human being or car for special applications.

(2) Create Primary Objects

The COIR engine changes the size and aspect ratio of the basic objects and creates primary objects. In FIG. 3 the COIR engine specifies four steps in both the horizontal direction and vertical direction. As a result, 16 primary objects are created from one basic object. The number of the variants depends on the application.

(3) Calculate Similarity Between the Primary Object and Metadata

Figure 4:
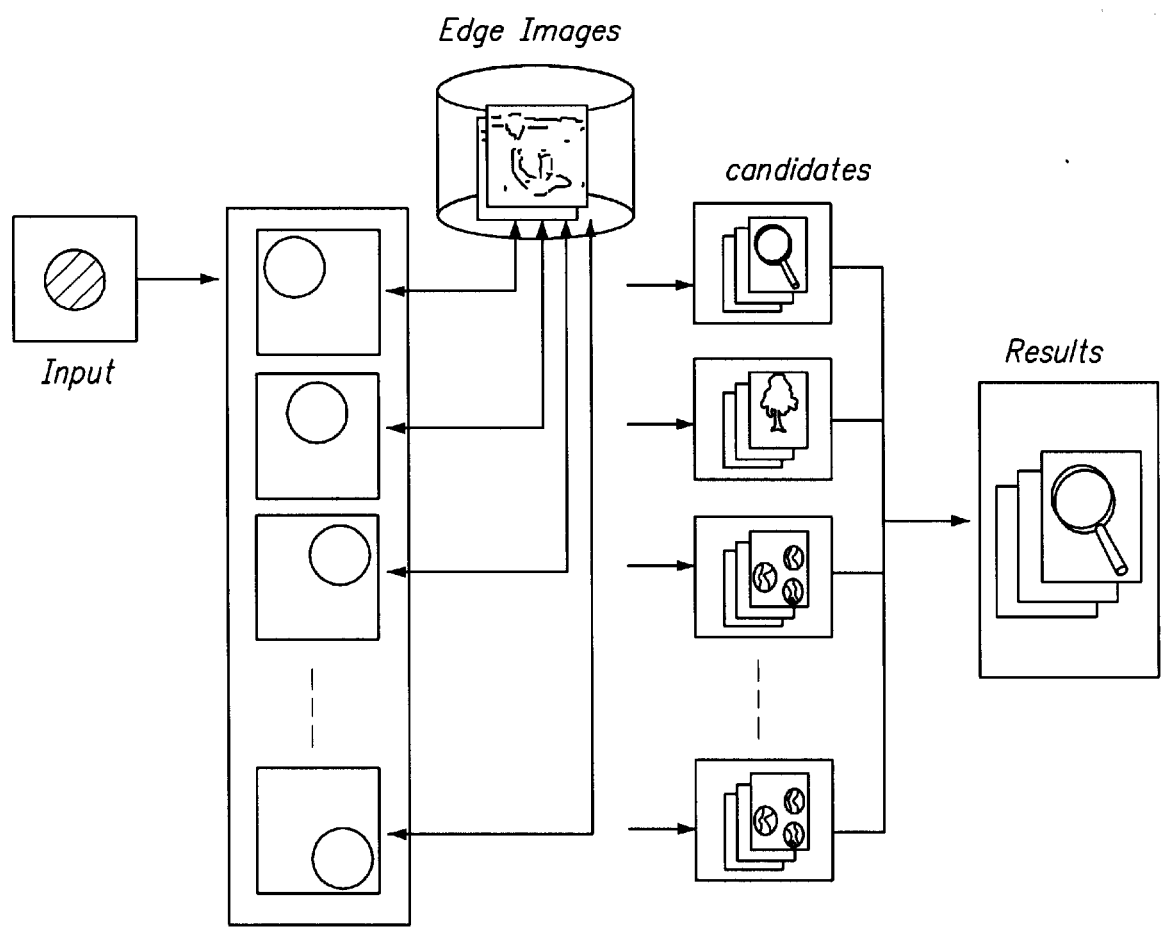
FIG. 4 shows a clustering procedure in accordance with an embodiment of the present invention when the query is location independent.

Using the algorithm described in the related application Ser. No. 09/064,086 entitled "Method and Apparatus for Image Querying Using Object Boundaries," the COIR engine calculates the similarity between the primary object and metadata in the database. Since this process can be executed off-line and high speed execution is not required, the COIR engine applies the boundary-based analysis described in the related application to all the metadata. According to the application, the system designer has the option of specifying location independence. In order to support location independence, the COIR engine creates several sets of images from the primary object element shape by primary object location shifting. This is shown in FIG. 4 Since the matching process itself also considers the robustness about the shifting, the COIR engine does not have to create so many shifting images. After the matching procedure, the COIR engine gathers the scores for every shifted image, extracts the maximum values and stores them.

(4) Determine the Category

Based on threshold values, which are defined by the system designer, the COIR engine specifies the class for each image. By changing the threshold values, the system designer can control how many images should be classified under one primary object. Since the score is normalized based on the average and standard deviation of the raw similarity values, the system designer can easily estimate the volume of the images stored under one primary object.

The interface presented to the user of the COIR search engine, using the classification results, discussed above, will now be discussed. Classification in accordance with the present invention assists in-providing an effective search mechanism for large databases. Such classification provides a rough filter for images which are not likely to be of interest to the user and also reduces the number of images to be processed through a finer matching procedure. In addition, this classification result allows the system to provide more effective functions to users through human-machine interaction. The COIR engine provides effective components, which support user queries and allows the user to better understand search results. This interface will now be discussed in further detail.

Search queries based upon a primary object allow the user to create a visual example for a search query, where the primary object can be assigned a weight. In accordance with the present invention, the user is shown a list of primary objects supported by the system. The user can then specify his/her query by choosing from the list of primary objects and can also specify the importance of each of the selected primary objects.

Figure 6:
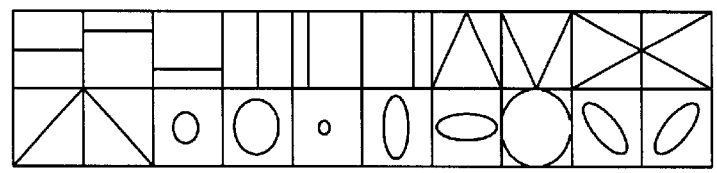
FIG. 6 shows an example of a set of primary objects which the user may specify in a query which may be location and size dependent.
Figure 5:
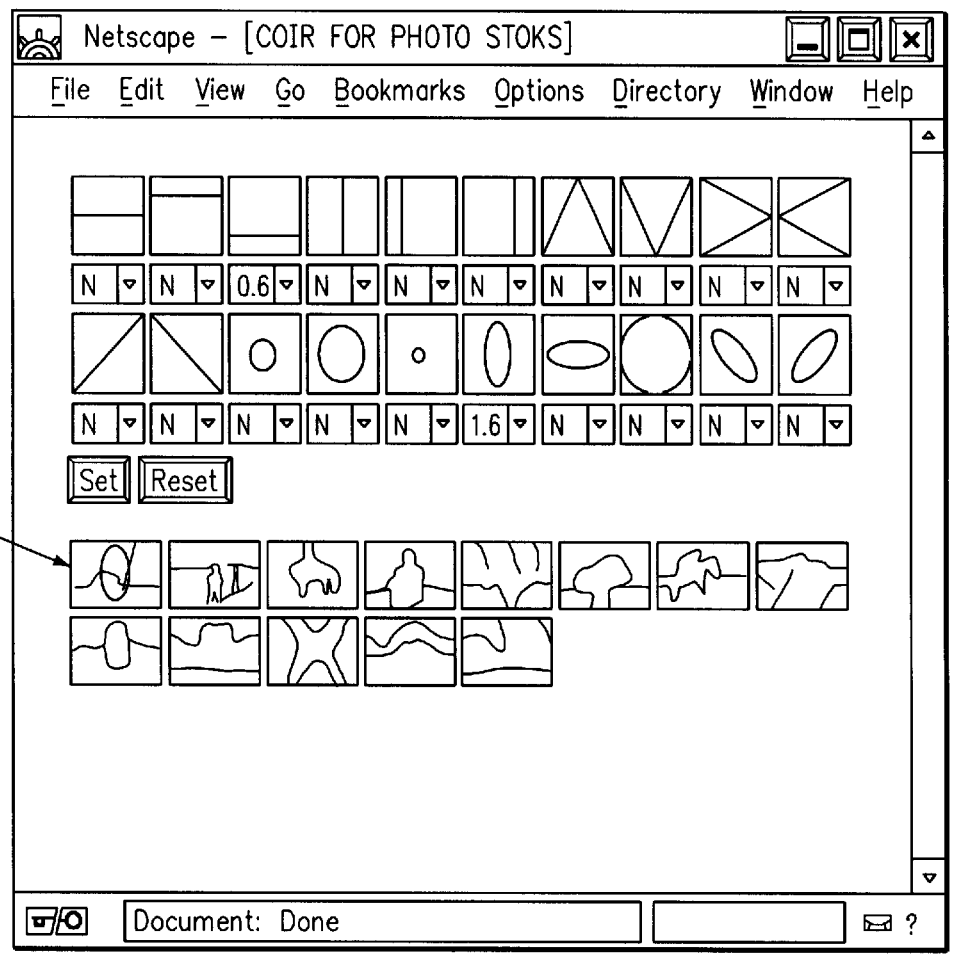
FIG. 5 shows search results based upon primary object matching in accordance with the present invention.
Figure 5:
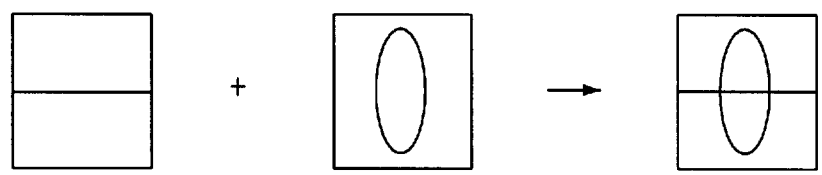

FIG. 5 shows a sample screen image of the retrieval method based on primary objects in accordance with the present invention. The results of a user specified query can be based upon location dependent or location independent classification results, depending upon the requirements of the application. In FIG. 5, location dependent classification criteria have been used. More specifically, in FIG. 5, the user has specified multiple primary objects as the query, a horizontal line at the bottom of the image and an elliptical object at the center of the image. The retrieval results reflect the integrated composition of the primary objects specified by the user. In one example, as shown in FIG. 6, the user is given the option of selecting from 20 kinds of primary objects.

The primary object-based interface in accordance with the present invention has the following advantages. First, primary objects are easy to specify since the user can simply select from the primary objects displayed to them on a screen. Compared to drawing a rough sketch, the user may more easily create a visual example as a query using the primary objects of the present invention. Since the shapes of the primary objects are intuitive, users can easily imagine the integrated result. Second, a wide variety of query images may be specified using the primary objects. Since a user can specify multiple primary objects at one time and merge the effect of the primary objects, the user can represent a wide variety of queries. Compared to searching for images displayed in a browsing table, users can more easily express a composition they may have in their mind using the primary objects of the present invention.

Third, the present invention allows the user to specify the importance of the specified primary object(s). Each primary object specified in a user query is evaluated separately. This allows a user to assign a level of importance to each of the specified primary objects. Suppose, for example, that the user wishes to mainly focus on an object on the left hand side of a query image. In such a case, the user can specify a threshold value for the primary object on the left hand side of the query image which is higher than for other primary objects specified in the query image. Fourth, since scores are normalized based on the average and standard deviation, the user can roughly estimate the number of the candidates to be retrieved. Finally, there is a great deal of flexibility in the selection of primary objects. The system designer can specify the available primary objects at will. Based upon the contents of the database of images to which the search engine is applied, the designer can select the primary objects to be made available to a user of the search engine. For example, for a collection of pots in a museum, the system designer can provide primary objects which represent the typical shapes of the pots.

Retrieval based upon queries and classification using primary objects allows users to understand the search results more intuitively. By using an interface in which the user may specify the primary objects to form a query and assign a level of importance to each specified primary object, the user can browse through the results, focusing on specific objects. Many factors often contribute to the similarity between images and a query. A user may want to concentrate on some special features and have those special features reflected in the retrieval results. The categorization by primary objects, in accordance with the present invention, extends the query specification ability of the user.

Figure 8:
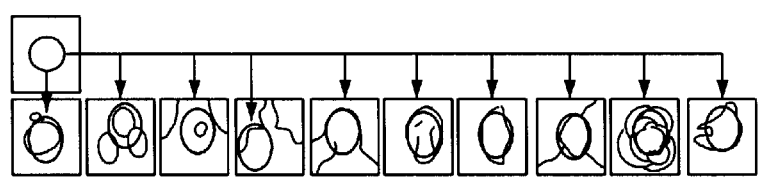
FIG. 8 shows search results based upon primary object matching, where the query primary object is highlighted in each result image.
Figure 7:
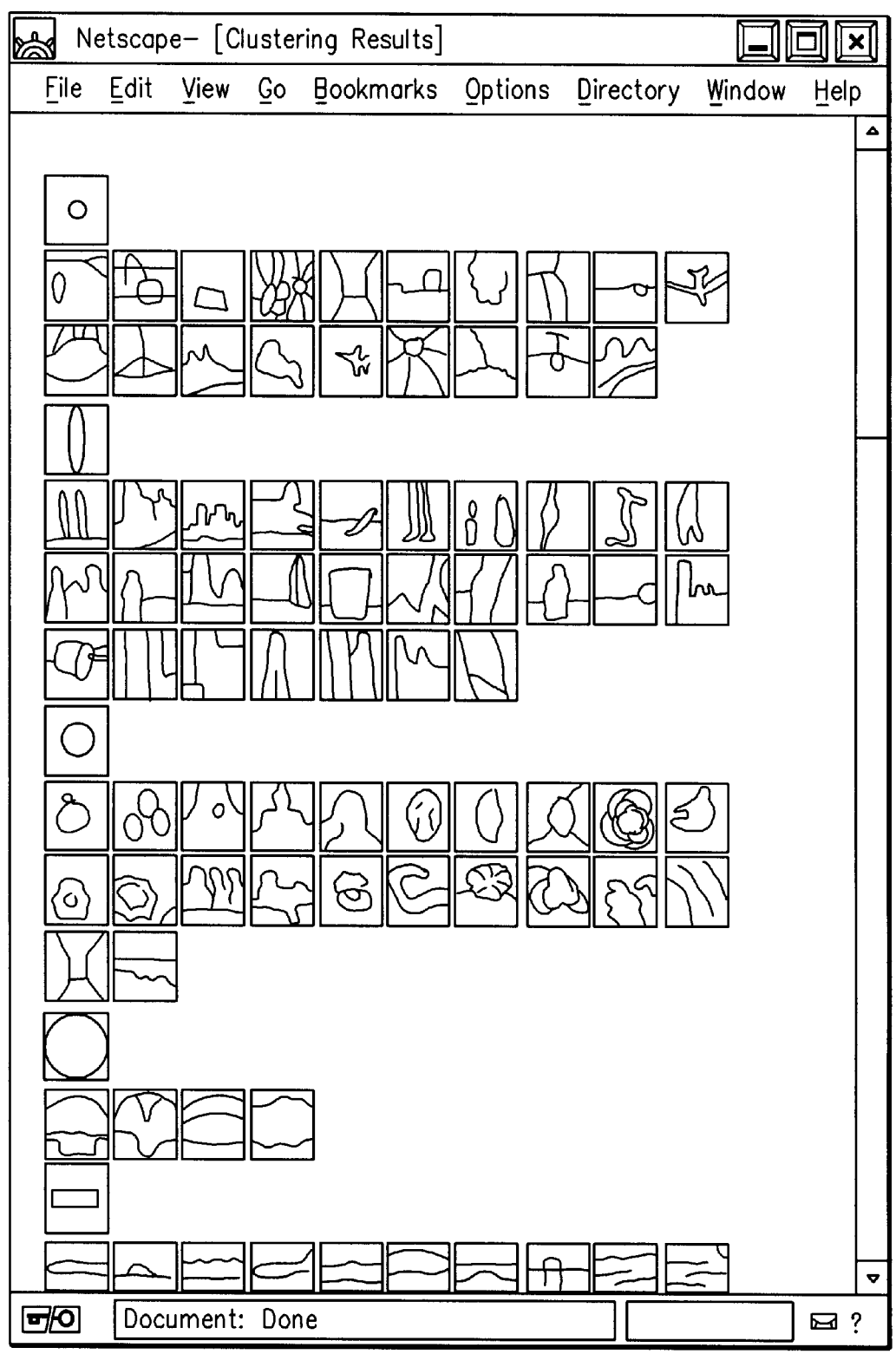
FIG. 7 shows search results based upon primary object selection.

FIG. 7 shows several examples of an implementation of the present invention. The image located on the upper left side of each of the sets of images shown in FIG. 7, represents a specified primary object. Below each of the specified primary objects, the correctly extracted images are shown. Note that the objects are extracted as location-independent. In FIG. 8, extracted objects in each of the result images are shown by using a dark contrasting circle or oval. Each of these highlighted objects has a slightly different size and different shape from the primary object. However, there is a close correlation between the specified primary object and the highlighted objects in each of the result images.

Figure 9:
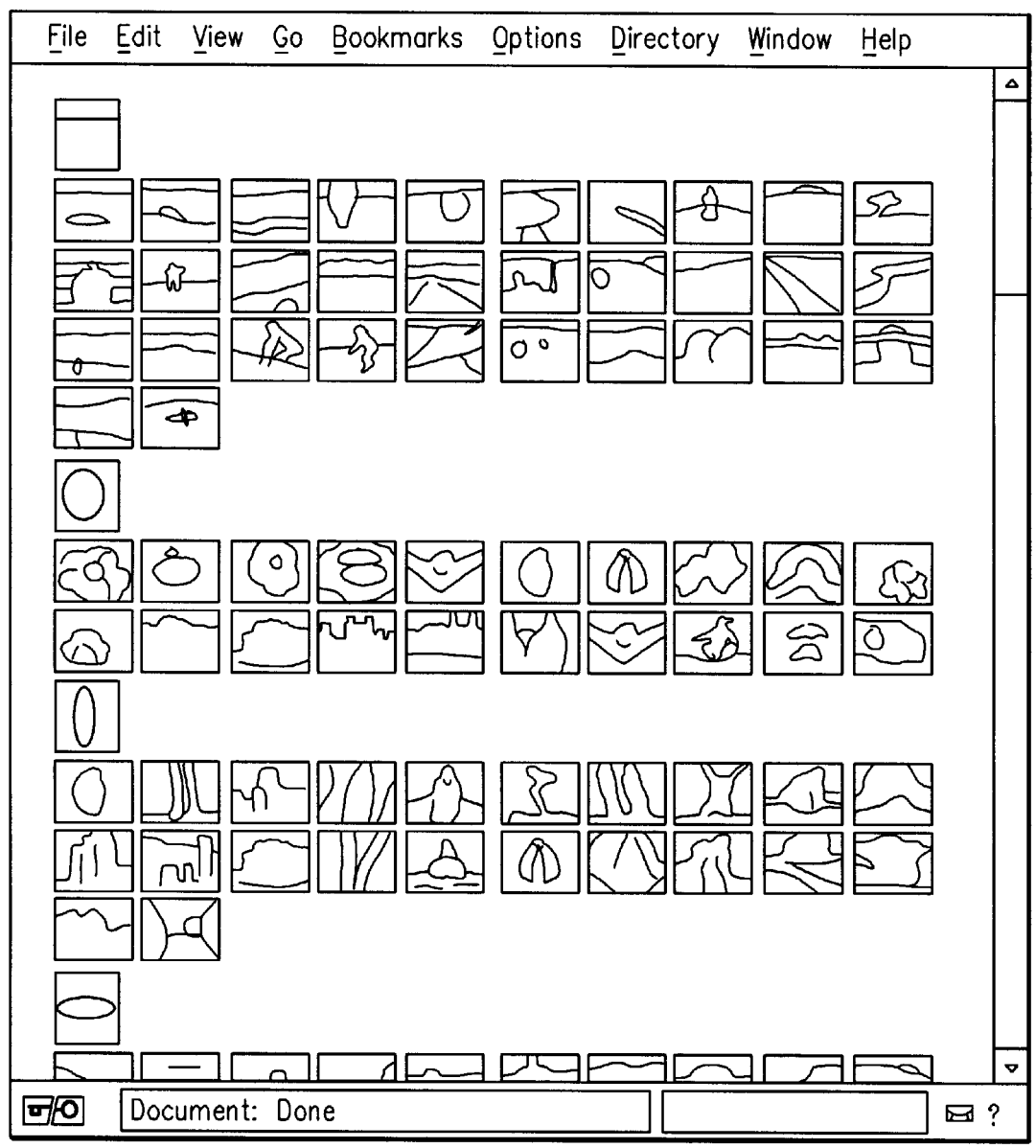
FIG. 9 shows search results based upon location dependent primary object matching.

FIG. 9 shows a screen image of the results of a location dependent primary object based search. Using a set of primary objects represented in FIG. 6, the COIR engine classifies the images. In FIG. 9, the images are classified based on the similarity of the location of objects in the result images and the location of the horizontal line in the query image, shown in the upper left corner of FIG. 9.

Thus, in accordance with the present invention, a new classification and search interface, based upon the concept of primary objects, has been presented. The present invention efficiently classifies images based upon primary objects contained in the images. Using the interface of the present invention, a user need not draw a rough sketch to create a visual example for a search query. Users can simply specify the desired primary objects for the query. Additionally, the user can specify the importance of the respective objects in the query image.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of querying a database of images, the method comprising the steps of:
    (a) selecting at least one primary shape from a set of primary shapes as a query to be applied to the database of images;
    (b) selecting at least one of a plurality of categories of images for each of the at least one primary shape selected, the categories having been formed by calculating a similarity value between each of the images and each of the primary shapes and classifying the images into the categories based on a threshold for the similarity value, each of the categories being represented by one of the primary shapes; and
    (c) displaying ones of the images in the selected categories.

2. The method according to claim 1, wherein, when more than one primary shape is specified, the step of displaying displays only the images in an intersection of the categories.

3. The method according to claim 1, further comprising the step of defining a spatial relationship between the selected primary shapes when more than one primary shape is selected.

4. The method according to claim 1, further comprising the step of assigning a weight value to each of the selected primary shapes when more than one primary shape is selected.

5. The method according to claim 1, wherein the primary shapes comprise base primary shapes, including a circle, a square, a triangle and a line.

6. The method according to claim 1, wherein the primary shapes comprise combinations of base primary shapes, the base primary shapes including a circle, a square, a triangle and a line.

7. The method according to claim 1, wherein the primary shapes comprise variations of base primary shapes based upon size and aspect ratio.

8. The method according to claim 1, wherein the calculation of the similarity value is dependent upon a location of objects within the images.

9. The method according to claim 1, wherein the calculation of the similarity value is independent of a location of objects within the images.

10. The method according to claim 1, wherein a value of the threshold determines a number of the displayed images.

11. The method according to claim 1, wherein the database of images is a multimedia database.

12. The method according to claim 1, wherein the database of images is on the World Wide Web (WWW).

13. A system of querying a database of images, the system comprising:
    (a) a workstation, including a display; and
    (b) an application program, wherein a user selects at least one primary shape from a set of primary shapes as a query to be applied to the database of images; whereupon the application program selects at least one of a plurality of categories of images for each of the at least one primary shape selected, the categories having been formed by calculating a similarity value between each of the images and each of the primary shapes and classifying the images into the categories based on a threshold for the similarity value, each of the categories being represented by one of the primary shapes; and whereupon ones of the images in the selected categories are displayed on the display.

14. The system according to claim 13, wherein in the application program, when more than one primary shape is specified, only the images in an intersection of the categories is displayed.

15. The system according to claim 13, wherein, in the application program, a spatial relationship is defined between the selected primary shapes when more than one primary shape is selected.

16. The system according to claim 13, wherein, in the application program, a weight value is assigned to each of the selected primary shapes when more than one primary shape is selected.

17. The system according to claim 13, wherein the primary shapes comprise base primary shapes, including a circle, a square, a triangle and a line.

18. The system according to claim 13, wherein the primary shapes comprise combinations of base primary shapes, the base primary shapes including a circle, a square, a triangle and a line.

19. The system according to claim 13, wherein the primary shapes comprise variations of base primary shapes based upon size and aspect ratio.

20. The system according to claim 13, wherein, in the application program, the calculation of the similarity value is dependent upon a location of objects within the images.

21. The system according to claim 13, wherein, in the application program, the calculation of the similarity value is independent of a location of objects within the images.

22. The system according to claim 13, wherein a value of the threshold determines a number of the displayed images.

23. The system according to claim 13, wherein the database of images is a multimedia database.

24. The system according to claim 13, wherein the database of images is on the World Wide Web (WWW).

* * * * *

UNITED STATES PATENT AND TRADEMARK OFFICE
CERTIFICATE OF CORRECTION

PATENT NO.      : 6,269,358 B1
DATED           : July 31, 2001
INVENTOR(S)     : Kiyoji Hirata It is certified that error appears in the above-identified patent and that said Letters Patent is hereby corrected as shown below:

<u>Title page,</u>
Please add the following:

-- [73] Assignee:   NEC USA, INC., Princeton, NJ (US) --

Signed and Sealed this

Fifteenth Day of October, 2002

*Attest:*

JAMES E. ROGAN
*Attesting Officer*     *Director of the United States Patent and Trademark Office*